US007480923B2

(12) United States Patent  
Aaron et al.

(10) Patent No.: US 7,480,923 B2  
(45) Date of Patent: Jan. 20, 2009

(54) DRIVE BEZELS FOR COMPUTER STORAGE SYSTEMS

(75) Inventors: Robert C. Aaron, Boise, ID (US); Leslie G. Christie, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 720 days.

(21) Appl. No.: 11/117,037

(22) Filed: Apr. 28, 2005

(65) Prior Publication Data

US 2006/0245157 A1 Nov. 2, 2006

(51) Int. Cl. *G11B 17/04* (2006.01)
(52) U.S. Cl. .................................. 720/646
(58) Field of Classification Search ............... 720/646  
See application file for complete search history.

(56) References Cited

U.S. PATENT DOCUMENTS

| | | | | |
|---|---|---|---|---|
| 5,467,235 A * | 11/1995 | Watanabe | ............... | 360/99.06 |
| 5,610,781 A * | 3/1997 | Watanabe | ............... | 360/99.06 |
| 5,659,440 A * | 8/1997 | Acosta et al. | .............. | 360/92.1 |
| 5,933,295 A * | 8/1999 | Uwabo et al. | ............ | 360/266.2 |
| 5,963,529 A * | 10/1999 | Kabasawa | ................. | 720/646 |
| 6,067,201 A * | 5/2000 | Shimizu et al. | ............... | 360/69 |
| 6,095,445 A * | 8/2000 | Hentrich | ................... | 242/332.4 |
| 6,292,444 B1 * | 9/2001 | Ikeda et al. | .............. | 369/44.29 |
| 6,466,435 B2 | 10/2002 | Dong | | |
| 6,560,098 B1 | 5/2003 | Beinor, Jr. et al. | | |
| 6,616,005 B1 | 9/2003 | Pereira et al. | | |
| 6,710,971 B2 * | 3/2004 | Nawa | ...................... | 360/96.51 |
| 2002/0041484 A1 * | 4/2002 | Lajara et al. | ................. | 361/687 |
| 2002/0131198 A1 * | 9/2002 | Kim | ......................... | 360/96.5 |
| 2003/0039060 A1 * | 2/2003 | Komatsu et al. | ......... | 360/99.04 |
| 2003/0169530 A1 * | 9/2003 | Tamura et al. | ................ | 360/93 |
| 2004/0255313 A1 * | 12/2004 | Kaczeus et al. | ............. | 720/651 |
| 2005/0237662 A1 * | 10/2005 | Chamorro et al. | ............. | 360/93 |

FOREIGN PATENT DOCUMENTS

GB 2425645 A * 11/2006  
JP 02056793 A * 2/1990

* cited by examiner

*Primary Examiner*—Allen T Cao

(57) ABSTRACT

Drive bezels for computer storage systems are disclosed. An exemplary system may include a drive device operable to read and write data on a storage cartridge. A first drive bezel may be provided for the drive device, the first drive bezel fitted with a sensor arm to detect insertion and removal of the storage cartridge during operation in an automatic mode. A second drive bezel may also be provided for the drive device, the second drive bezel fitted with an eject button to remove the storage cartridge from the drive device during operation in a manual mode.

27 Claims, 6 Drawing Sheets

DRIVE BEZELS FOR COMPUTER STORAGE SYSTEMS

TECHNICAL FIELD

The described subject matter relates to computer storage, and more particularly to drive bezels for computer storage systems.

BACKGROUND

Computer storage systems may be provided for handling large volumes of computer-readable data on removable storage media, such as magnetic tape cartridges and optical storage media, to name only a few examples (generally referred to herein as "storage cartridges"). Such storage systems may be provided as automated storage systems including one or more storage locations for a plurality of storage cartridges and a robotic picker assembly to handle the storage cartridges. Stand-alone storage systems may be provided for smaller volume storage, e.g., as personal or desktop units connected to a personal computer or server.

In both the automated and stand-alone systems, one or more drive devices may be included for read/write operations on the storage cartridge. In automated systems, the drive devices may be provided with an optical sensor to detect insertion and removal of storage cartridges in the drive device. For example, the robotic picker assembly should not be moved if the storage cartridge was not properly inserted into or removed from the drive device. In addition, the control system needs to determine which drive devices already contain storage cartridges after a power recovery.

The drive devices for stand-alone systems are typically operated manually and therefore do not need optical sensors to detect insertion and removal of the storage cartridge. Instead, these systems are provided with an eject button so that a user can remove the storage cartridge from the system after a read/write operation. Accordingly, separate drive devices are typically provided for the stand-alone storage systems, increasing manufacturing and inventory costs.

BRIEF DESCRIPTION OF THE DRAWINGS

FIG. 4b is a detailed perspective view of an exemplary sensor arm for the drive bezel shown in FIG. 4a.

DETAILED DESCRIPTION

Briefly, exemplary storage systems described herein include drive devices that may be implemented in either an automated storage system or a stand alone storage system. In an exemplary embodiment, the drive device may be fitted with either a first drive bezel or a second drive bezel. The first drive bezel may include a sensor arm to detect insertion and removal of the storage cartridge during operation in an automatic mode. The second drive bezel may include an eject button to enable operation in a manual mode.

In exemplary embodiments, the drive devices may be manufactured with common components and used interchangeably in either an automated storage system or a stand alone storage system by attaching the different drive bezels to the drive device. A drive controller may be provided to automatically detect an operating mode for the drive device (e.g., automatic or manual).

Exemplary System

Figure 1:
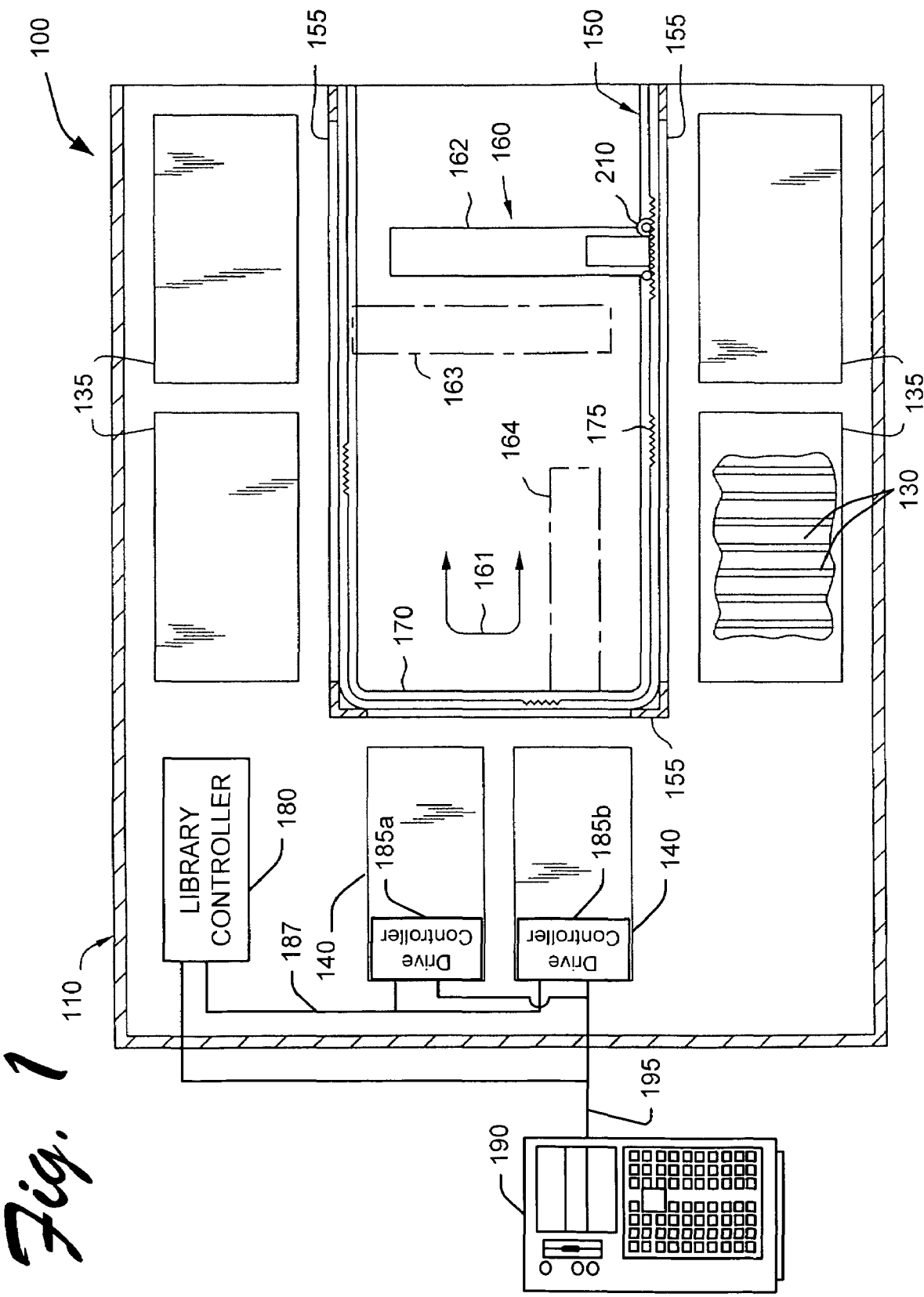
FIG. 1 is a top plan view of an exemplary automated storage system.

FIG. 1 is a top plan view of an exemplary automated storage system. Exemplary storage system 100 may include one or more libraries 110. The libraries 110 may be modular (e.g., configured to be stacked one on top of the other), allowing the storage system 100 to be readily expanded. The library 110 is configured to store computer readable data on one or more storage cartridge, such as magnetic data cartridges, optical media, and disk drives, to name only a few examples.

The storage cartridges may be provided in one or more storage locations 130. In an exemplary embodiment, the storage cartridges may be stored in one or more removable storage magazines 135, each having a plurality of storage locations. The storage locations may be arranged in the library 110 as shown in FIG. 1, although other arrangements are also possible.

One or more drive devices 140 may also be provided for read/write operations. In one exemplary embodiment, each library 110 is provided with at least one drive device 140. However, in other embodiments the drive devices 140 do not need to be included with each library 110 in a storage system 100.

The storage system 100 may also include at least one robotic picker assembly, or picker 160. For example, the picker 160 is adapted to engage a storage cartridge, withdraw the storage cartridge (e.g., from one of the storage locations 130), transport the storage cartridge, and insert the storage cartridge into the drive device 140 for a read/write operation.

Picker 160 may be mounted to a guide system 150 in the storage system 100. In one implementation, the guide system 150 may be mounted in a translate frame 155 that moves the picker 160 between vertically stacked libraries 110. In any event, guide system 150 may define a horizontal displacement path (illustrated by arrows 161) adjacent the storage locations 130 and the data access device(s) 140.

For purposes of illustration, picker 160 is shown in FIG. 1 as it may be moved through displacement path 161 to positions 162, 163, and 164. The picker 160 is positioned adjacent the storage locations 130 at positions 162; and 163, and adjacent one of the drive devices 140 at position 164.

In an exemplary embodiment, the guide system 150 may comprise a railing 170 and a gear track 175. Picker 160 may be movably mounted to the railing 170. The picker 160 also includes gears (not shown) that cooperate with gear track 175 to move the picker 160 through displacement path 161 on the guide system 150.

It is noted that although the storage system 100 is shown in FIG. 1 according to a particular configuration, other suitable configurations are also contemplated as being within the scope of the invention. In addition, the number of libraries, and the number of storage locations and drive devices provided with each library, may depend upon various design considerations. Such considerations may include, but are not limited to, the frequency with which data is accessed. Still other considerations may include, by way of example, the physical dimensions of the library, the storage locations, and/or the drive devices.

Storage system 100 may also include a library controller 180 for implementing control operations in the library 110. An exemplary library controller 180 may include a processor (or processing units) and software and/or firmware provided in computer-readable storage (or memory). The library controller 180 is operable to process computer-readable instructions (e.g., computer data signals embodied in one or more carrier waves). The computer-readable instructions-may be received from a network computer, user interface provided as part of a storage system, or a system memory.

Library controller 180 may include program code to control movement of the picker 160. For example, library controller 180 may establish a communications link (e.g., via RF communication) with a picker controller (not shown) at the picker 160. Library controller 180 may then issue commands, e.g., to retrieve storage cartridges from the storage locations 130 in the automated storage system 100 and deliver the storage cartridges to the drive device 140. Library controller 180 may also include program code for maintaining system inventory.

Library controller 180 may be linked to one or more drive controllers 185*a*, 185*b* at the drive devices 140 via an automated control interface (ACI) 187. Library controller 180 may be implemented to issue commands to one or more drive controllers 185*a*, 185*b* via the ACI 187. Drive controllers 185*a*, 185*b* may also be provided with processing capability and program code to control operations at the drive devices 140 (e.g., load, eject, drive status, etc.) in response to instructions from the library controller 180 and/or a system controller 190.

In an exemplary embodiment, system controller 190 may be implemented as a server computer on a network (e.g., LAN or WAN). System controller 190 may be communicatively coupled to the library controller 180 and the drive controllers 185*a*, 185*b* via link 195 (e.g., SCSI cable). System controller 190 may be implemented to control operations for the storage system 100 and provide an interface to the storage system 100 for data transfer.

Figure 2:
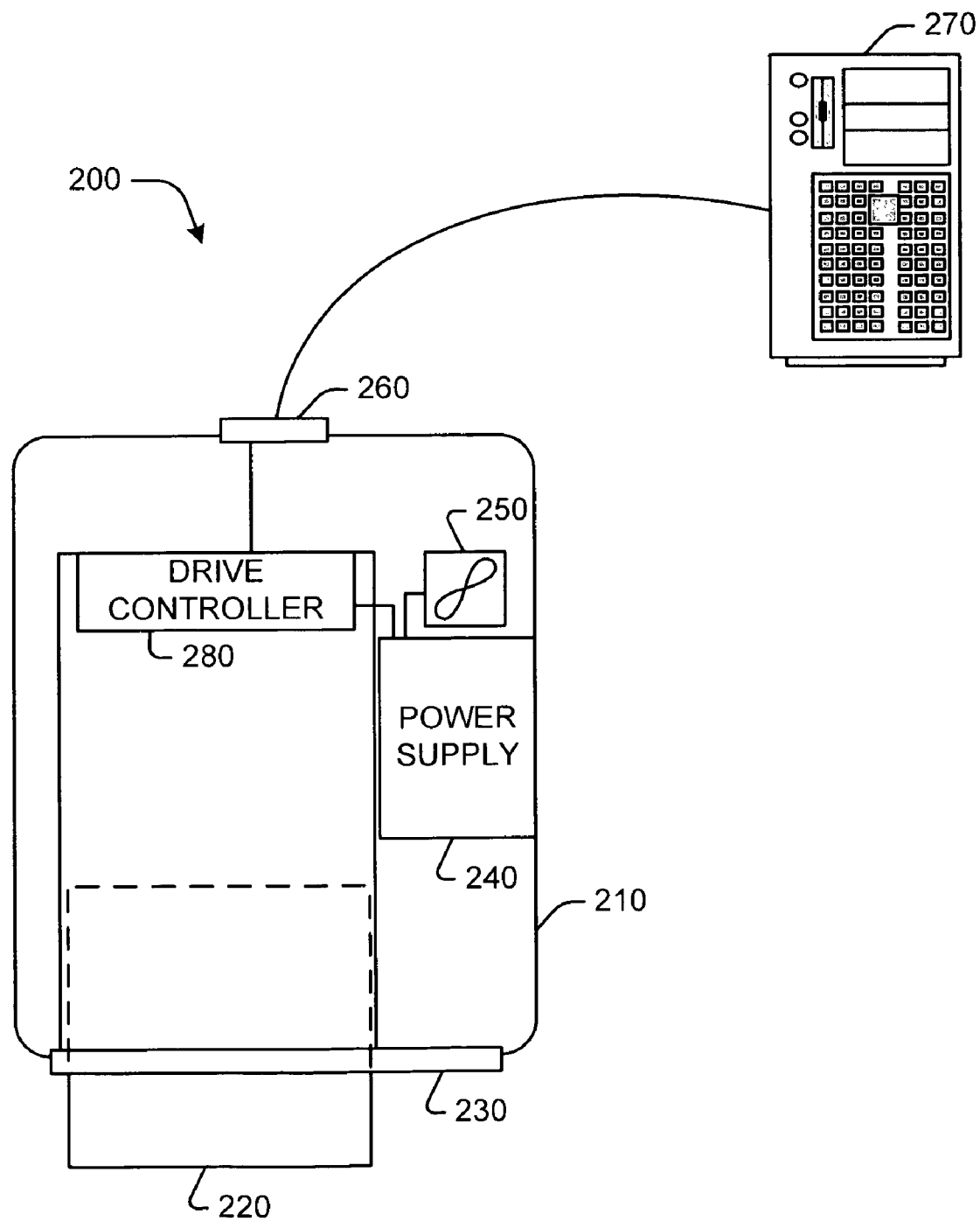
FIG. 2 is a top plan view of an exemplary stand-alone storage system.

FIG. 2 is a top plan view of an exemplary stand-alone storage system 200. The stand-alone system 200 may include a drive device 210 similar to the drive device 140 implemented in the automated storage system to perform read/write operations on the same or similar storage cartridges 220 that are used in the automated storage system. A drive bezel 230 may be provided for the drive device 210 for operation in the stand-alone version, as will be described in more detail below with reference to FIGS. 6, 6*a*, and 6*b*.

Drive device 210 may also include a power supply 240, cooling fan 250 and connections 260 (e.g., SCSI) to a system controller such as server computer 270. The stand-alone system 200 may also include a drive controller 280 for controlling the drive device 210 (e.g., read/write and eject operations). In an exemplary embodiment, the drive device 210 includes common components (e.g., power supply 240, cooling fan 250, connections 260, etc.) for implementation in either the automated storage system 100 (FIG. 1) or the stand-alone system 200.

At least the drive controllers are common to both the automated storage system 100 (FIG. 1) and stand-alone system 200. The drive controllers may be provided with both versions of program code, i.e., for controlling the drive device when it is provided in either an automated storage system or a stand-alone system. The drive controller may be enabled to detect if the drive device is coupled to a library controller 180 (FIG. 1) via an automation control interface (ACI), thus indicating that the drive device is being implemented in an automated storage system 100 (FIG. 1). If the drive device is not connected via the ACI, the drive controller determines that the drive device is being implemented in a stand-alone system 200. The drive controller may then invoke program code for controlling the drive device in either the automated storage system or the stand-alone system.

Figure 3:
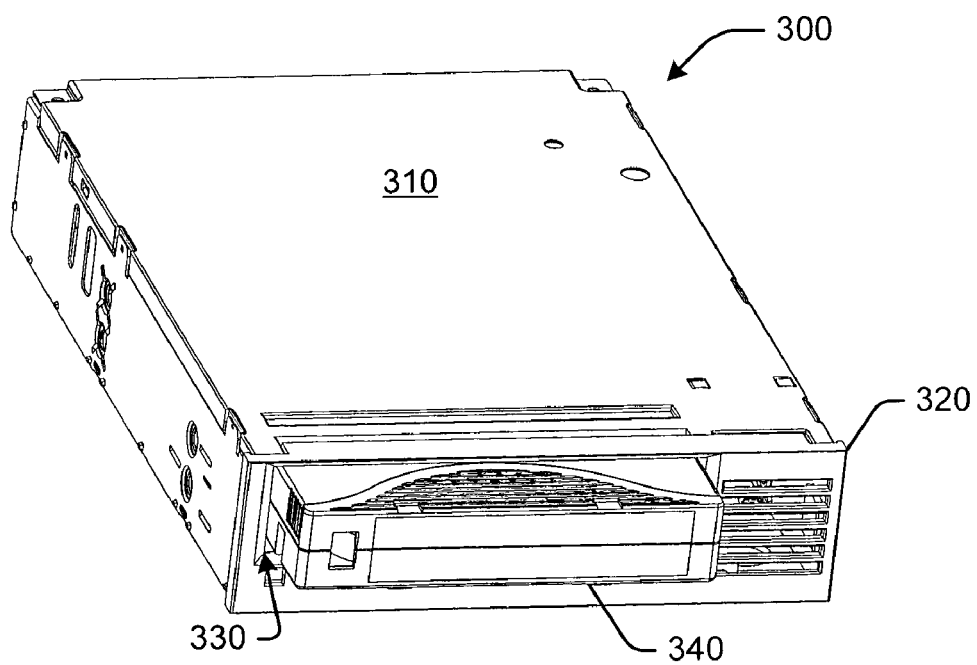
FIG. 3 is a perspective view of an exemplary drive device as it may be implemented in either an automated storage system or a stand-alone storage system.

FIG. 3 is a perspective view of an exemplary drive device 300 as it may be implemented in either an automated storage system or a stand-alone storage system. Exemplary drive device 300 may include a chassis 310 for mounting the drive device 300 in a storage system (e.g., the automated storage system 100 shown in FIG. 1 or the stand-alone storage system 200 shown in FIG. 2). In an exemplary embodiment, the chassis 310 may be manufactured of a metal or metal alloy although other materials may also be used).

A read/write head (not shown) may be provided within the chassis 310 for performing read/write operations. An eject mechanism (not shown) may also be provided within the chassis 310 for ejecting a storage cartridge 340 from the drive device 300. Read/write heads and eject mechanisms are both well understood in the computer storage arts and therefore further description is not necessary.

A drive bezel 320 may be mounted to the chassis 310, e.g., as shown in FIG. 3. The type of drive bezel 320 that is implemented may depend on whether the drive device 300 is to be used in an automated storage system or in a stand-alone storage system. Exemplary drive bezels are shown and described in more detail below for both types of storage systems.

Figure 4:
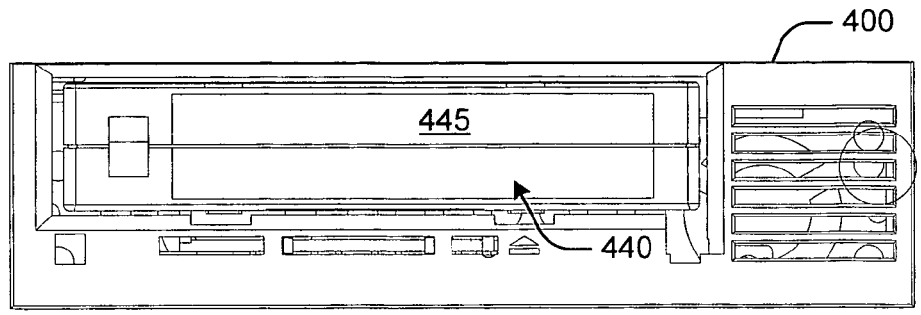
FIG. 4 is a front plan view of an exemplary drive bezel for a drive device in an automated storage system.

FIG. 4 is a front plan view of an exemplary drive bezel 400 for a drive device in an automated storage system. In an exemplary embodiment the drive bezel 400 may be manufactured of a plastic or other substrate material (although metals may also be used). An opening 440 may be formed through drive bezel 400 for insertion and removal of a storage cartridge 445 in the drive device. Drive bezel 400 may also include other optional features (not shown) for use in an automated storage system, such as, e.g., optical targets that the picker may use to locate opening 440 or guide posts for inserting the storage cartridge. The opening 440 may also be formed larger than an opening on a drive bezel for use in a stand-alone version to provide additional tolerance for inserting the storage cartridge.

Figure 4A:
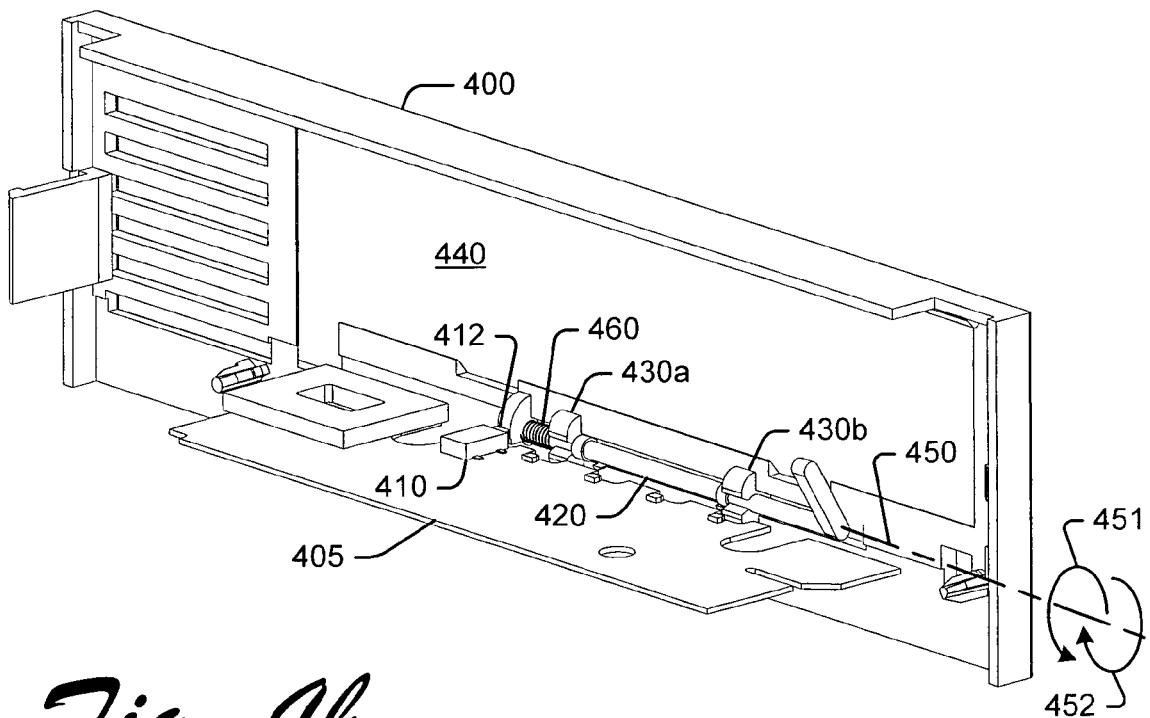
FIG. 4a is an interior perspective view of the exemplary drive bezel shown in FIG. 4.

FIG. 4*a* is an interior perspective view showing the exemplary drive bezel 400 as it may be attached to the drive device. A portion of a PC board 405 (e.g., for the drive controller) as it may be mounted to the chassis adjacent drive bezel 400 when drive bezel 400 is attached to the drive device. A switching device 410 may be mounted on the PC board 405 to relay a status signal to a drive controller, which may be polled by a library controller (e.g., the library controller 180 in FIG. 1) to determine the status of the drive. The switching device 410 may be actuated or de-actuated to indicate insertion and removal of a storage cartridge in the drive device.

Figure 4B:
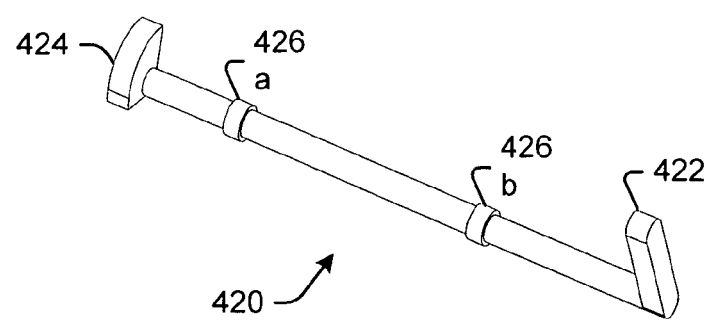

A sensor arm 420 may be pivotally mounted to the drive bezel 400 adjacent an opening 440 provided through the drive bezel 400 for insertion and removal of the storage cartridge. A detailed perspective view of the exemplary sensor arm 420 is also shown in FIG. 4b. In an exemplary embodiment, the sensor arm 420 may be mounted in clips 430a, 430b on the drive bezel 400 to enable the sensor arm 420 to readily rotate. Bands 426a, 426b on the sensor arm 420 maintain the position of the sensor arm, e.g., so that it does not slide along axis 450.

Sensor arm 420 may also include a lever portion 422, e.g., integrally formed on one end of the sensor arm 420. Lever portion 422 may extend substantially perpendicular from the sensor arm 420. In an exemplary embodiment, sensor arm 420 may be mounted to the drive bezel 400 such that lever portion 422 extends into a path of a storage cartridge when it is inserted and removed from the drive device (i.e., opening 440).

Sensor arm 420 may also include a trigger portion 424. In an exemplary embodiment, the trigger portion 424 is oblong-shaped. Sensor arm 420 may be mounted to the drive bezel 400 such that when it is rotated about axis 450 in the direction illustrated by arrow 451, the trigger portion 424 is extended to press against a button 412 on the switching device 410. When sensor arm 420 is rotated about axis 450 in the opposite direction (illustrated by arrow 452), the trigger portion 424 is retracted to release button 412 on the switching device 410.

A spring 460 (or other elastic member) may be provided to bias the sensor arm 420 toward a default position. For example, the default position shown in FIG. 4 includes the lever portion 430 of sensor arm 420 extending into the opening 420 and the switching device 410 in an "off" state. However, it is noted that other embodiments are also contemplated. For example, the switching device 410 may be in an "on" state when the sensor arm 420 is in the default position.

Before continuing, it is noted that the drive bezel 400 for use in automated storage systems is not limited to the sensor arm 420 described above. For example, the sensor arm 420 may include different linkages, arms, sliders, switches, etc. In other embodiments, different types of sensors may be provided, including, but not limited to motion sensors, optical sensors, switches, etc.

Figure 5:
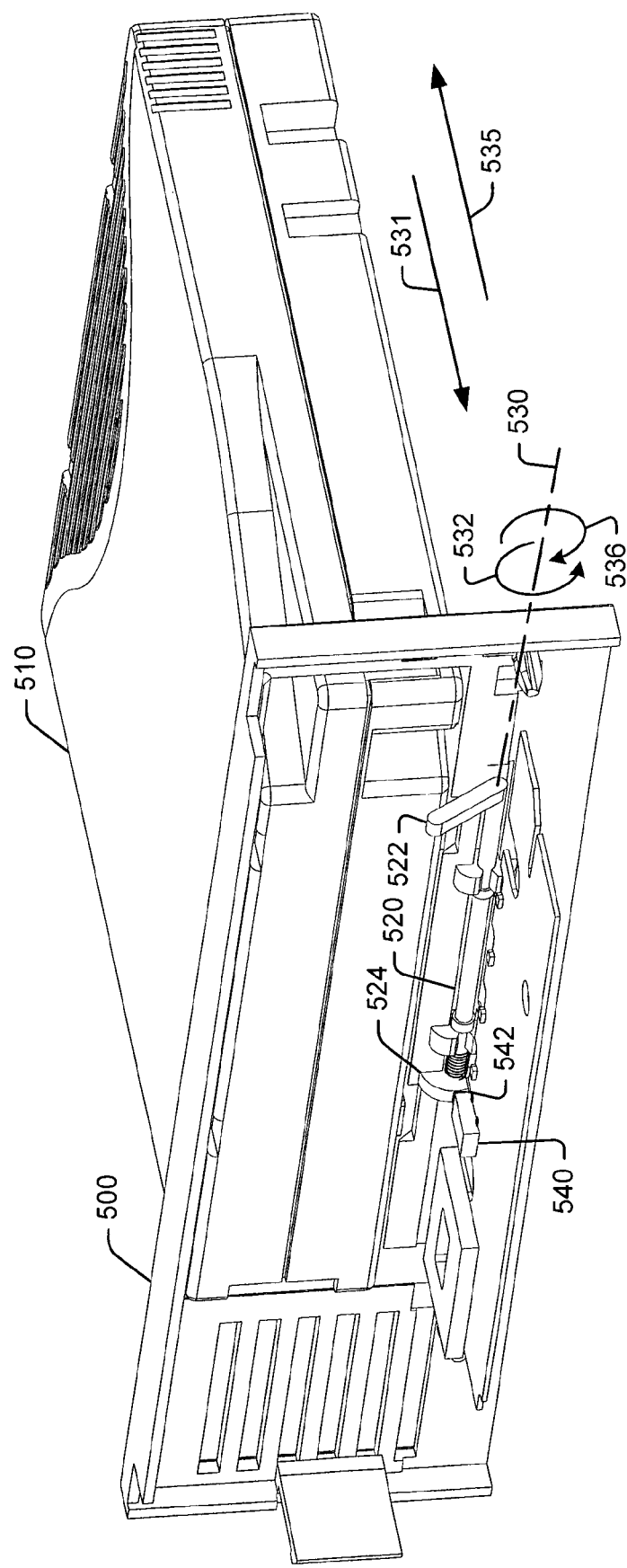
FIG. 5 is an interior perspective view of an exemplary drive bezel illustrating a storage cartridge being inserted and removed in a drive device.

FIG. 5 is an interior perspective view of an exemplary drive bezel 500 illustrating insertion and removal of a storage cartridge 510 in the drive device. During an insertion operation, the storage cartridge 510 may be inserted into the drive device by a robotic picker assembly (e.g., picker 160 in FIG. 1). During a removal operation, the storage cartridge may be ejected from the drive device by an eject mechanism (not shown) in the drive device.

During the insertion operation, storage cartridge 510 contacts sensor arm 520 on the drive bezel 500 at the lever portion 522. As the storage cartridge 510 moves into the drive device (e.g., in the direction of arrow 531), lever portion 522 moves out of the path of storage cartridge 510 and causes the sensor arm 520 to rotate about axis 530 in the direction of arrow 532. The rotating sensor arm 520 also causes trigger portion 524 to contact button 542 and actuate the switching device 540. The actuated switching device 540 may assert a signal to the drive controller which may be monitored by a library controller for the automated storage system, e.g., indicating that the storage cartridge 510 is inserted in the drive device. Switching device 540 may continue asserting the signal until the button 542 is released, indicating removal of the storage cartridge 510 from the drive device.

During the removal operation, the storage cartridge 510 is withdrawn in the direction of arrow 535. As the storage cartridge 510 moves out the drive device, lever portion 522 maintains contact with the storage cartridge 510 and causes the sensor arm 520 to rotate about axis 530 in the direction of arrow 536. The rotating sensor arm 520 also causes trigger portion 524 to release from button 542 and de-actuate the switching device 540. The de-actuated switching device 540 may de-assert the signal, e.g., indicating that the storage cartridge 510 is removed from the drive device.

Figure 6:
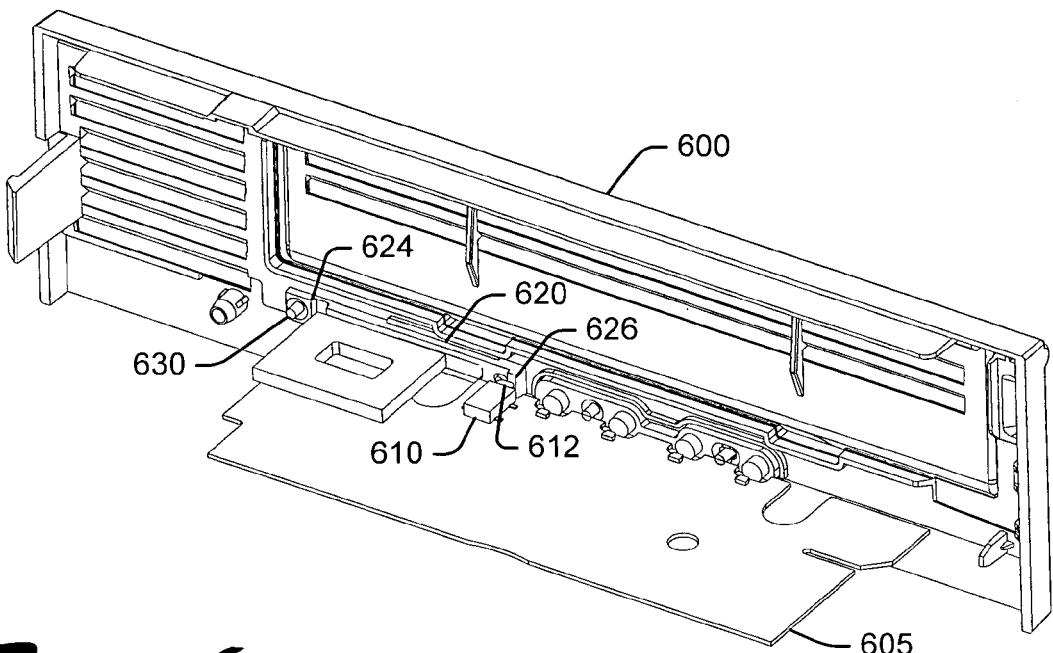
FIG. 6 is an interior perspective view of an exemplary drive bezel for a drive device in a stand-alone storage system.

FIG. 6 is an interior perspective view of an exemplary drive bezel 600 for a drive device in a stand-alone storage system. A portion of a PC board 605 (e.g., for the drive controller) is also shown as it may be mounted to the chassis adjacent drive bezel 600 when drive bezel 600 is attached to the drive device. A switching device 610 may be mounted on the PC board 605 to relay a status signal to a drive controller (e.g., the drive controller 220 in FIG. 2), e.g., if the switching device 610 is actuated to operate the eject mechanism in the drive device. This signal may also be used by the drive controller, e.g., to initiate an unload sequence.

Drive bezel 600 may be manufactured similarly to the drive bezel for drive devices in automated storage systems (e.g., drive bezel 400 in FIG. 4). However, in the stand-alone systems there is typically not a need for a sensor mechanism (e.g., the sensor arm 420 described above with reference to FIG. 4) because the user manually inserts and ejects the storage cartridges and is therefore readily able to determine when a storage cartridge is in the drive device. Instead, an eject button 620 may be provided to operate the eject mechanism (not shown).

Figure 6A:
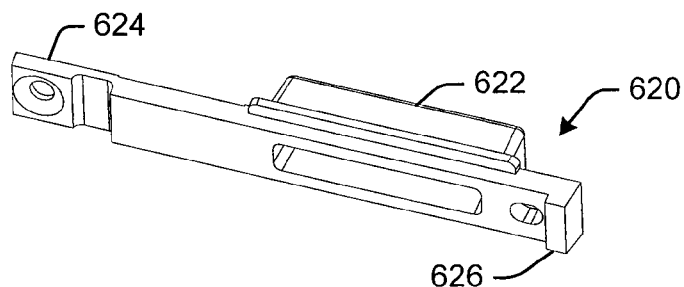
FIG. 6a is a detailed perspective view of an exemplary eject button for the exemplary drive bezel shown in FIG. 6.

FIG. 6a is a detailed perspective view of an exemplary eject button 620 for the exemplary drive bezel 600 shown in FIG. 6. Eject button 620 may include a button portion 622, a mounting portion 624 on one end, and a trigger portion 626 on the opposite end. In an exemplary implementation, the eject button 620 may be mounted to the drive bezel 600 by attaching the mounting portion 624 to a pin 630 (FIG. 6) on the drive bezel 600. Of course, other embodiments for mounting the eject button 620 to the drive bezel 600 are also contemplated.

Figure 6B:
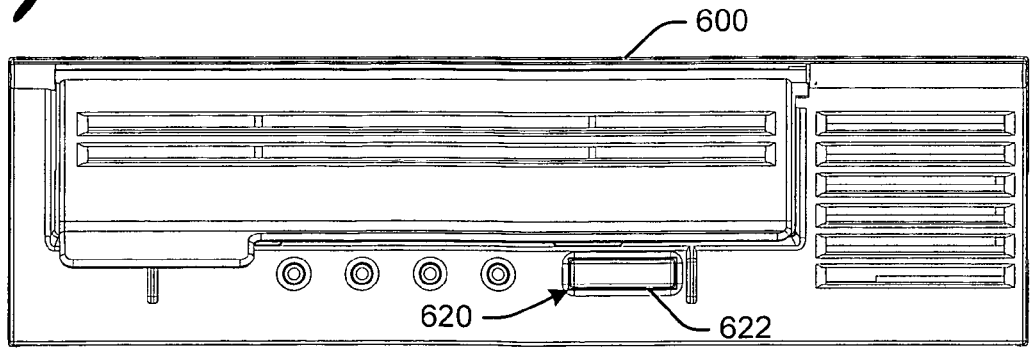
FIG. 6b is a front plan view of the exemplary drive bezel shown in FIG. 6.

The eject button 620 may be mounted to the drive bezel 600 such that the button portion 622 extends through an opening formed in the drive bezel 600, as shown in the front plan view of the drive bezel 600 in FIG. 6b. In addition, trigger portion 626 of the eject button 620 may be substantially aligned with button 612 on switching device 610.

Eject button 620 is enabled to move in response to the button portion 622 being pressed by a user, i.e., to operate the eject mechanism in the drive device. If the eject button 620 is pressed, trigger portion 626 contacts button 612 and actuates switching device 610. The actuated switching device 610 asserts a signal which is issued to the drive controller (e.g., drive controller 220 in FIG. 2). The signal may also be used by the drive controller to operate the eject mechanism in the drive device to eject the storage cartridge.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A computer storage system, comprising:
   a drive device operable to read and write data on a storage cartridge, the drive device configured for use with:
   a first drive bezel for the drive device, the first drive bezel fitted with a sensor arm to detect insertion and removal of the storage cartridge during operation in an automatic mode; and a second drive bezel for the drive device, the second drive bezel fitted with an eject button to remove the storage cartridge from the drive device during operation in a manual mode.

2. The computer storage system of claim 1 further comprising a switching device on the drive device, the switching device common to both the first drive bezel and the second drive bezel.

3. The computer system storage of claim 2 wherein the switching device is operatively associated with the sensor arm on the first drive bezel to detect insertion and removal of the storage cartridge in the automatic mode.

4. The computer storage system of claim 2 wherein the switching device is operatively associated with the eject button on the second drive bezel to remove the storage cartridge from the drive device in the manual mode.

5. The computer storage system of claim 1 wherein the sensor arm is pivotally connected to the first drive bezel, the sensor arm rotating in a first direction in response to insertion of the storage cartridge into the drive device, and the sensor arm rotating in a second direction in response to removal of the storage cartridge from the storage device.

6. The computer storage system of claim 1 wherein the sensor arm on the first drive bezel protrudes into an insertion and removal path for the storage cartridge in the storage device.

7. The computer storage system of claim 1 further comprising a drive controller operatively associated with the drive device, the drive controller automatically determining whether the drive device is for operation in the automatic mode or the manual mode.

8. The computer storage system of claim 1 further comprising a drive controller operatively associated with the drive device, the drive controller automatically configuring the drive device for operation in either the automatic mode or the manual mode.

9. The computer storage system of claim 1 further comprising a drive controller operatively associated with the drive device, the drive controller receiving input based on a position of the sensor arm to detect insertion and removal of the storage cartridge during operation in the automatic mode.

10. The computer storage system of claim 1 further comprising a drive controller operatively associated with the drive device, the drive controller receiving input based on a position of the eject button to remove the storage cartridge from the drive device during operation in the manual mode.

11. A method, comprising:
providing a first drive bezel for a drive device to operate in an automated storage system;
providing a second drive bezel for the same drive device to operate in a stand-alone storage system; and
automatically determining an operation mode for the drive device.

12. The method of claim 11 further comprising automatically detecting a connection to an automated control interface if the operation mode is for the automated storage system.

13. The method of claim 11 further comprising automatically configuring the drive device for operation in the automated storage system.

14. The method of claim 13 further comprising configuring the drive device to receive input from a sensor arm on the drive bezel to detect insertion and removal of a storage cartridge in the drive device.

15. The method of claim 11 further comprising automatically detecting a connection to via a standard drive cable if the operation mode is for the stand-alone storage system.

16. The method of claim 11 further comprising automatically configuring the drive device for operation in the stand-alone storage system.

17. The method of claim 16 further comprising configuring the drive device to receive input from an eject button on the drive bezel to eject the storage cartridge from the drive device.

18. A system, comprising:
a drive device operable to read and write data on a storage cartridge in either an automated storage system or a stand-alone storage system with a common drive bezel for the drive device, the drive bezel having either a first configuration or a second configuration,
in the first configuration, the common drive bezel fitted with a sensor arm for use in the automated storage system; and
in a second configuration, the common drive bezel fitted with an eject button for use in the stand-alone storage system; and
a drive controller operatively associated with the drive device, the drive controller automatically determining whether the drive device has a drive bezel configured for the automated storage system or a drive bezel configured for the stand-alone storage system.

19. The system of claim 18 further comprising a switching device on the drive device, the switching device interfacing with the sensor arm on the common drive bezel in the first configuration and with the eject button on the common drive bezel in the second configuration.

20. The computer storage system of claim 19 wherein the switching device interfaces with the sensor arm on the common drive bezel in the first configuration to detect insertion and removal of the storage cartridge.

21. The computer storage system of claim 19 wherein the switching device interfaces with the eject button on the common drive bezel in the second configuration to effect removal of the storage cartridge.

22. The system of claim 18 wherein the sensor arm is pivotally connected to the common drive bezel in the first configuration, the sensor arm rotating in a first direction in response to insertion of the storage cartridge into the drive device, and the sensor arm rotating in a second direction in response to removal of the storage cartridge from the drive device.

23. The system of claim 18 wherein the sensor arm protrudes into an insertion and removal path formed through the common drive bezel in the first configuration to detect insertion and removal of the storage cartridge in the drive device.

24. The system of claim 18 wherein the drive controller operatively associated with the drive device, the drive controller automatically configuring the drive device for the automated storage system or the stand-alone storage system.

25. A system comprising:
drive means for reading and writing data on a storage cartridge;
means for detecting insertion and removal of the storage cartridge if the drive means is operated in an automated storage system; and
means for removing the storage cartridge from the same drive means if the drive means is operated in a stand-alone storage system.

26. The system of claim 25 further comprising means for automatically configuring the drive device for operation in the automated storage system.

27. The system of claim 25 further comprising means for automatically configuring the drive device for operation in the stand-alone storage system.

* * * * *

UNITED STATES PATENT AND TRADEMARK OFFICE
CERTIFICATE OF CORRECTION

PATENT NO. : 7,480,923 B2 Page 1 of 1
APPLICATION NO. : 11/117037
DATED : January 20, 2009
INVENTOR(S) : Robert C. Aaron et al.

It is certified that error appears in the above-identified patent and that said Letters Patent is hereby corrected as shown below:

In column 7, line 9, in Claim 3, delete "system storage" and insert -- storage system --, therefor.

In column 8, line 50, in Claim 25, after "system" insert -- , --.

Signed and Sealed this

Fifth Day of May, 2009

JOHN DOLL
*Acting Director of the United States Patent and Trademark Office*